United States Patent Office 2,822,354
Patented Feb. 4, 1958

2,822,354

DIHYDRAZINES IN AQUEOUS EMULSION POLYMERIZATION

Carl A. Uraneck, Phillips, Tex., and Richard J. Goertz, Bartlesville, Okla., assignors to Phillips Petroleum Company, a corporation of Delaware No Drawing. Application March 30, 1953
Serial No. 345,724

11 Claims. (Cl. 260—84.7)

This invention relates to an improved process for polymerizing unsaturated organic compounds while dispersed in an aqueous emulsion.

In low temperature emulsion polymerization work many variations in recipes and procedure have been developed. Recipes have been widely used which are the redox type, i. e., formulations wherein both oxidizing and reducing components are present. The oxidizing components used frequently include materials of a peroxidic nature, and particularly compounds such as benzoyl peroxide and cumene hydroperoxide. However, it has been found that not all peroxidic materials will function in the capacity of the oxidant in a redox emulsion polymerization system, and that some peroxides which function satisfactorily at higher temperatures are of little value when it is desired to carry out the polymerization at low temperatures, e. g., below the freezing point of water. The reducing components frequently used have been organic derivatives of heavy metals which act as an activator to decompose the peroxide at low temperatures at which normally it would remain substantially stable. However, the use of such reducing components introduces into the polymer heavy metals which will catalyze subsequent autoxidation and consequent deterioration.

We have now discovered that excellent polymerization rates are obtained when liquid vinylidene compounds, polymerizable when dispersed in an aqueous medium, are dispersed in an aqueous medium and polymerized in the presence of a polymerization catalyst composition comprising a peroxidic compound as an oxidant selected from the group consisting of organic peroxides and organic hydroperoxides and a reductant, or activator, composition which comprises the use of a polyhydrazine having the formula $H(HNNHC_nH_{2n})_xNHNH_2$ when $n$ is in the range of 1 to 8, preferably 2 to 4, and $x$ is in the range of 1 to 6, preferably 1 to 3, to prepare a synthetic rubber or other polymeric material. We have discovered, further, that carbamates of the above disclosed polyhydrazines are effective activators, or reductants, and that mixtures of 2 or more polyhydrazines or mixtures of 2 or more polyhydrazine carbamates or any combination of said polyhydrazines and their carbamates can be utilized effectively in accordance with this invention. We believe that the polyhydrazines disclosed herein are novel compositions of matter when $x$ in the above formula is in the range of 2 to 6 and that the carbamates of these polyhydrazines are novel compositions of matter when $x$ is in the range of 1 to 6. In addition to the fact that the activator compositions of this invention are especially adaptable for use in low temperature polymerization processes, these recipes afford a means for effecting polymerization reactions in the absence of heavy metal salt activators.

Polyhydrazines of the above formula include ethylene dihydrazine, propylene-1,2-dihydrazine, tetramethylene dihydrazine, hexamethylene dihydrazine, 1,2,5,6,9,10,13,14-octaazatetradecane $(H_2NNHCH_2CH_2NHNHCH_2CH_2$
$NHNHCH_2CH_2NHNH_2)$ etc. Dihydrazines can be prepared by reacting an alkylene dichloride with hydrazine in solution in an aqueous lower aliphatic alcohol. By employing a relatively large excess of the hydrazine, i. e., from 6 to 24 molecular proportions of hydrazine for each molecular proportion of dihalide, compounds of the formula $H_2NNHC_nH_{2n}NHNH_2$ are formed as the major product. However, by increasing the ratio of alkylene dichloride to hydrazine, the yield of products of the formula $H(NHNHC_nH_{2n})_xNHNH_2$ where $x$ is greater than 1, is increased. When the polyhydrazines are prepared by this method, the hydrochloride of the polyhydrazine will be formed and will be effective, as such, as a reductant.

As was pointed out above, the carbamates of the polyhydrazines of this invention also are useful as reductants in the polymerization, in an aqueous dispersion, of monomeric material to produce a synthetic rubber in the "peroxamine" recipe. These carbamates may be prepared by reacting carbon dioxide with any of the polyhydrazines, employing a technique similar to that used in the preparation of carbamates from ethylene diamine. These carbamates can be represented by the formula $H(NHNHC_nH_{2n})_xNHNHCOOM$ where M can be hydrogen, an alkali metal or ammonium, where $n$ is in the range of 1 to 8 and $x$ is in the range of 1 to 6. Carbon dioxide can also react with one or more of the secondary nitrogen atoms, thus forming dicarbamates and higher polycarbamates. Preparation of these carbamates in high yields is readily accomplished by adding excess solid or gaseous carbon dioxide to a polyhydrazine compound, such as described above, in the presence of a solvent such as water and/or an alcohol, preferably ethyl, propyl or a butyl alcohol. The amount of solvent employed will generally be in the range from 1 to 20 parts per part of polyhydrazine by weight. Carbon dioxide is added to the polyhydrazine solution with constant stirring until heat is no longer evolved, and cooling is effected by any suitable means. During the addition of the carbon dioxide the mixture takes on the appearance of a heavy, viscous oil from which a white solid separates when additional carbon dioxide is introduced. The solvent is removed by decantation, filtration, or other suitable means, and the solid product is then washed with additional solvent and dried. When preparation of the carbamate is carried out in an open vessel, i. e., at atmospheric pressure, the product is predominantly the monocarbamate with only small amounts of the dicarbamate being formed. When the reaction is carried out under pressure, the reaction proceeds in the direction of the dicarbamate. This method for the preparation of carbamates is adapted from the method used by Mulvaney and Evans, Ind. Eng. Chem. 40, 393–397 (1948).

In general, two groups of organic peroxidic compounds can be used as an oxidant, those having the formula ROOH, known as hydroperoxides or hydroperoxymethanes, and those having the formula ROOR, where R in each instance is an organic radical. Examples of the latter group are those organic peroxides such as ditertiary butylperoxide, benzoyl peroxide, acetyl peroxide and the dialkyl peroxides, such as dibutyl-, dipentyl-, dihexyl- peroxides. These two general groups are not equivalents, however, and the hydroperoxides are preferred. The preferred hydroperoxides can be represented by the formula RR'R"COOH, wherein R is selected from the group consisting of hydrogen and organic radicals, and each of R' and R" is an organic radical, or R'R" together comprise a tetramethylene or pentamethylene group forming with the

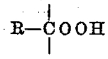

a cyclopentyl- or cyclohexylhydroperoxide. Each of R, R' and R" can be completely hydrocarbon in character, and can be of mixed character, such as aralkyl, alkaryl, and the like, and can also have non-hydrocarbon substituents, some of which will have the effect of making them more water-soluble and less oil (hydrocarbon)-soluble; particularly useful non-hydrocarbon substituents include oxygen in the form of hydroxy and ether compounds, sulfur in similar compounds (i. e. mercapto compounds and thioethers), and halogen compounds. Examples of such hydroperoxides include diisopropyl hydroperoxide (isopropyl(dimethyl)hydroperoxymethane), cumene hydroperoxide (phenyl(dimethyl)hydroperoxymethane), 1-methyl-1-hydroperoxycyclopentane, tetralin hydroperoxide, phenylcyclohexane hydroperoxide, octahydrophenanthrene hydroperoxide, diisopropylbenzene hydroperoxide (dimethyl(isopropylphenyl)-hydroperoxymethane), methylethyl(ethoxyphenyl)hydroperoxymethane, methyldecyl - (methylphenyl)hydroperoxymethane, dimethyldecylhydroperoxymethane, methylchlorophenylphenylhydroperoxymethane, and tertiarybutylisopropylbenzene hydroperoxide(dimethyl(tertiary-butylphenyl)-hydroperoxymethane). Such hydroperoxides can be easily prepared by simple oxidation, with free oxygen, of the corresponding hydrocarbon or hydrocarbon derivative, i. e. of the parent trisubstituted methane. The compound to be oxidized is placed in a reactor, heated to the desired temperature, and oxygen introduced at a controlled rate throughout the reaction period. The mixture is agitated during the reaction which is generally allowed to continue from about one to ten hours. The temperature employed is preferably maintained between 50 and 160° C., although in some instances it might be desirable to operate outside this range, that is, at either higher or lower temperatures. At the conclusion of the reaction the oxidized mixture may be employed as such, that is, as a solution of the hydroperoxide composition in the parent compound, or unreacted compounds may be stripped and the residual material employed. The major active ingredient in such a composition is the monohydroperoxide, or a mixture of monohydroperoxides. This hydroperoxide group appears to result from introduction of two oxygen atoms between the carbon atom of the trisubstituted methane and the single hydrogen atom attached thereto. Where there is another similar grouping in the molecule, the usual method of production just outlined appears to produce only the monohydroperoxide even though a dihydroperoxide appears to be structurally possible. Thus, in a simple case, from such an oxidation of diisopropylbenzene the primary product appears to be dimethyl(isopropylphenyl)hydroperoxymethane.

One large group of these hydroperoxymethanes is that group in which each of the three substituent groups is a hydrocarbon radical. One of the sub-groups of these compounds is the alkaryl-dialkyl hydroperoxymethanes, in which the two alkyl groups are relatively short, i. e. have from one to three or four carbon atoms each, including dimethyl(tertiary-butylphenyl)hydroperoxymethane, dimethyl(diisopropylphenyl)hydroperoxymethane, dimethyl(isopropylphenyl)hydroperoxymethane, dimethyl(dodecylphenyl)hydroperoxymethane, dimethyl(methylphenyl)hydroperoxymethane, and corresponding methylethyl and diethyl compounds, and the like. Another subgroup includes at least one long alkyl group directly attached to the hydroperoxymethane, such as methyldecyl (methylphenyl) hydroperoxymethane, ethyldecyl-phenylhydroperoxymethane, and the like. Still another subgroup includes trialkyl compounds, such as dimethyldecylhydroperoxymethane, and the like: aralkyl compounds, such as 1-phenyl-3-methyl-3-hydroperoxybutane, can also be considered to be members of this group. A further subgroup includes alkyldiaryl compounds, such as methyldiphenylhydroperoxymethane, methylphenyltolylhydroperoxymethane, and the like. A further subgroup is the triaryl compounds, such as triphenylhydroperoxymethane, tritolylhydroperoxymethane, and the like. A further subgroup comprises cyclopentyl and cyclohexyl hydroperoxides, such as result from oxidation of cyclohexanes, methylcyclopentane, and phenylcyclohexane, and compounds containing condensed ring structures such as 1,2,3,4,4a,9,10,10a-octahydrophenanthrene, which forms the corresponding hydroperoxide upon oxidation, etc. Organic peroxides and hydroperoxides preferably will have a total of not more than thirty carbon atoms per molecule, and the most active hydroperoxides usually have at least ten to twelve carbon atoms per molecule. Mixtures of these peroxides and/or hydroperoxides can be used, as desired.

The amount of polyhydrazine, derivative of polyhydrazine or mixture of such polyhydrazine and derivative used to obtain optimum results is dependent upon other ingredients in the recipe but will usually be in the range between 0.02 and 5 parts by weight per 100 parts of monomeric material with 0.04 to 2 parts being most generally preferred.

The amount of organic peroxide used to obtain an optimum reaction rate will depend upon the polymerization recipe employed and upon the reaction conditions. The amount is generally expressed in millimols per 100 parts of monomeric material, using in each instance the same units of weight throughout, i. e., when the monomeric material is measured in pounds the hydroperoxide is measured in millipound mols. The same is true for other ingredients in the polymerization recipe. An optimum rate of polymerization is usually obtained with the amount of hydroperoxymethane between 0.1 and 10 millimols per 100 parts by weight of monomeric material.

The monomeric material polymerized to produce polymers by the process of this invention comprises unsaturated organic compounds which generally contain the characteristic structure $CH_2=C<$ and, in most cases, have at least one of the disconnected valencies attached to an electronegative group, that is, a group which increases the polar character of the molecule such as a chlorine group or an organic group containing a double or triple bond such as vinyl, phenyl, cyano, carboxy or the like. Included in this class of monomers are the conjugated butadienes or 1,3-butadienes such as butadiene (1,3-butadiene), 2,3-dimethyl - 1,3 - butadiene, isoprene, piperylene, 3-furyl-1,3-butadiene, 3-methoxy-1,3-butadiene and the like; haloprenes, such as chloroprene (2-chloro-1,3-butadiene), bromoprene, methylchloroprene (2-chloro-3-methyl-1,3-butadiene), and the like; aryl olefins such as styrene, various alkyl styrenes, p-chlorostyrene, p-methoxystyrene, alpha-methylstyrene, vinylnaphthalene and similar derivatives thereof, and the like; acrylic and substituted acrylic acids and their esters, nitriles and amides such as acrylic acid, methacrylic acid, methyl acrylate, ethyl acrylate, methyl alpha-chloro-acrylate, methyl methacrylate, ethyl methacrylate, butyl methacrylate, methyl ethacrylate, acrylonitrile, methacrylonitrile, methacrylamide and the like, methyl isopropenyl ketone, methyl vinyl ketone, methyl vinyl ether, vinylethinyl alkyl carbinols, vinyl acetate, vinyl chloride, vinylidene chloride, vinylfurane, vinylcarbazole, vinylacetylene and other unsaturated hydrocarbons, esters, alcohols, acids, ethers, etc., of the types described. Such unsaturated compounds may be polymerized alone, in which case simple linear polymers are formed, or mixtures of two or more such compounds which are copolymerizable with each other in aqueous emulsion may be polymerized to form linear copolymers.

The present invention is directed primarily to the production of polymers, of conjugated dienes, which have physical properties classifying them as synthetic rubber, and the invention is particularly applicable to the polymerization of hydrocarbon monomeric materials. Such materials include 1,3-butadiene and other conjugated diolefin hydrocarbons having not more than six carbon atoms per molecule, halogen derivatives, such as chloroprene, fluoroprene, and the like, either alone, in admixture with each other, or together with minor amounts of unsaturated compounds which are copolymerizable therewith in aqueous emulsion, such as styrene, alpha methylstyrene, vinyltoluene, chlorostyrene, etc. In this case the products of the polymerization are high molecular weight linear polymers and copolymers which are rubbery in character and may be called synthetic rubber. Although, as can be readily deduced from the foregoing, there is a host of possible reactants, the most readily and commercially available monomers at present are butadiene itself (1,3-butadiene) and styrene. The invention will, therefore, be more particularly discussed and exemplified with reference to these typical reactants. With these specific monomers, it is usually preferred to use them together, in relative ratios of butadiene to styrene between 65:35 and 90:10 by weight. Although these proportions represent typical conditions, the scope of our invention includes greater or less, proportionately of these materials.

It is generally preferred that the emulsion be of an "oil in water" type, with the ratio of aqueous medium to monomeric material between about 0.5:1 and about 2.75:1, in parts by weight although a greater or less ratio will be operable and is within the scope of our invention. It is frequently desirable to include water-soluble components in the aqueous phase, particularly when the polymerization temperatures are below freezing. Inorganic salts and alcohols can be so used. Alcohols which are applicable, when operating at low temperatures, comprise water-soluble compounds of both the monohydric and polyhydric types, and include methyl alcohol, ethylene glycol, glycerine, erythritol, and the like. The amount of alcoholic ingredient used in a polymerization recipe must be sufficient to prevent freezing of the aqueous phase and generally ranges from 20 to 80 parts per 100 parts of monomers charged. In most cases the amount of water employed is sufficient to make the total quantity of the alcohol-water mixture equal 150 to 200 parts. In cases where it is desired to use a larger quantity of the alcohol-water mixture, say around 250 parts, the amount of alcohol may be increased to as much as 120 parts. It is preferred that the alcohol be such that it is substantially insoluble in the non-aqueous phase, and that 90 percent, or more, of the alcohol present be in the aqueous phase. A high-boiling alcohol such as glycerine is difficult to recover from the resulting serum; a low boiling alcohol such as methanol is easily removed and frequently preferred. Other aliphatic alcohols of higher boiling point than methanol, such as a propanol, are frequently less satisfactory. If the resulting latex tends to gel at low reaction temperatures, a larger proportion of aqueous phase should be used. In the practice of the invention suitable means will be necessary to establish and maintain an emulsion and to remove reaction heat to maintain a desired reaction temperature. The polymerization can be conducted in batches, semicontinuously, or continuously. The total pressure on the reactants is preferably at least as great as the total vapor pressure of the mixture, so that the initial reactants will be present in liquid phase. Usually 50 to 98 percent of the monomeric material is polymerized.

In preparing synthetic rubber by polymerizing conjugated dienes, by the process of our invention, it is usually desirable to use a polymerization modifying agent, as is usually true in other polymerizations to produce synthetic rubber. Preferred polymerization modifiers for use in the process of the present invention are alkyl mercaptans, and these may be of primary, secondary, or tertiary configurations, and generally range from $C_8$ to $C_{16}$ compounds, but may have more or fewer carbon atoms per molecule. Mixtures or blends of mercaptans are also frequently considered desirable and in many cases are preferred to the pure compounds. The amount of mercaptan employed will vary, depending upon the particular compound or blend chosen, the operating temperature, the freezing point depressant employed, and the results desired. In general, the greater modification is obtained when operating at low temperatures and therefore a smaller amount of mercaptan is added to yield a product of a given Mooney value, than is used at higher temperatures. In the case of tertiary mercaptans, such as tertiary $C_{12}$ mercaptans, blends of tertiary $C_{12}$, $C_{14}$, and $C_{16}$ mercaptans, and the like, satisfactory modification is obtained with 0.05 to 0.3 part mercaptan per 100 parts monomers, but smaller or larger amounts may be employed in some instances. In fact, amounts as large as 2.0 to 5.0, or more, parts per 100 parts of monomers may be used. Thus, the amount of mercaptan is adjusted to suit the case at hand.

One of the advantages of the polymerization recipes, as disclosed herein, is that they are applicable for use in the production of "high solids" latices, i. e., latices resulting from the use of a smaller amount of aqueous medium than is generally used in conventional polymerization procedures. For this type of operation the ratio of aqueous phase to monomeric material will generally be in the range from 0.5:1 to 1:1 and the reaction can be carried out in a batch-type, semi-batch-type or continuous type operation.

Emulsifying agents which are applicable in these low temperature polymerizations are materials such as potassium laurate, potassium oleate, and the like, and salts of rosin acids, either alone or in admixture with each other. However, other emulsifying agents, such as nonionic emulsifying agents, salts of alkyl aromatic sulfonic acids, salts of alkyl sulfates, and the like which will produce favorable results under the conditions of the reaction, can also be used in practicing the invention, either alone or in admixture with soaps. The amount and kind of emulsifier used to obtain optimum results is somewhat dependent upon the relative amounts of monomeric material and aqueous phase, the reaction temperature, and the other ingredients of the polymerization mixture. Usually an amount between about 0.3 and 5 parts per 100 parts of monomeric material will be found to be sufficient.

The pH of the aqueous phase may be varied over a rather wide range without producing deleterious effects on the conversion rate of the properties of the polymer. In general, the pH may be within the range from 9 to 12 and it may be advantageous to have a pH higher than 12 in some instances. In most cases optimum results are obtained if the pH is 10 or higher.

When carrying out polymerization reactions according to the process of this invention, it is frequently considered desirable to include an electrolyte in the system, such as potassium chloride, trisodium phosphate, or other salt which will not produce deleterious effects. One function of an electrolyte is to increase the fluidity of the latex. Generally the amount of such salt will not exceed one part per 100 parts of monomers.

As was stated above, the polymerization can be carried out with the polyhydrazine, or derivatives thereof, of this invention and an oxidizing agent and in the absence of any added heavy metal salts, such as iron salts. However, it has been found that under certain conditions the addition of a complex of a heavy metal salt, such as an iron-Versene complex, provides even faster rates of polymerization of the monomers.

We generally use the polyhydrazines or carbamates of polyhydrazines or combinations of same as activators in polymerization recipes at low polymerization temperatures, i. e., from about 30° C. to well below the freezing point of water, such as −40° C. or lower. However, temperatures as high as 60° C. or even higher may be employed if desired. Generally, we prefer the reaction temperature to fall in the range of from −20° C. to +5° C.

Advantages of this invention are illustrated by the following examples. The reactants, and their proportions, and the other specific ingredients of the recipes are presented as being typical and should not be construed to limit the invention unduly.

EXAMPLE I

Three polyhydrazine derivatives, as well as hydrazine itself, were tested in the emulsion polymerization recipe as set forth below. These derivatives as well as hydrazine were tested both in the absence and in the presence of a mixture of ferrous sulfate and Versene Fe-3.

The three polyhydrazine derivatives are designated as A, B and C and were prepared as follows:

A. Dihydrazinoethane dihydrochloride was prepared by reacting ethylene chloride and hydrazine. The product was recovered by crystallization.

B. Reaction product of one mol ethylene chloride and 4 mols hydrazine. The solvent was removed by distillation and the resulting solution contained 66.3 weight percent solids. The reaction product is a complex mixture containing primarily the hydrochlorides of dihydrazinoethane and a small amount of the hydrochlorides of polyhydrazinoethanes.

C. Reaction product of one mol ethylene chloride, 2 mols hydrazine, and 2 mols ethylene diamine. Solvent removed by distillation and the resulting solution contained 60 weight percent solids. The reaction product is a complex mixture of di- and polyhydrazinopolyethanes, di- and polyaminopolyethanes, and probably mixed hydrazinoamino compounds.

Recipe

| Components: | Parts by weight |
|---|---|
| Butadiene | 70. |
| Styrene | 30. |
| Water | 200. |
| K-ORR soap [1] | 5. |
| KCl | 0.3. |
| MTM [2] | 0.25. |
| Diox 7 (27.6 percent) [3] | 0.378. |
| $FeSO_4.7H_2O$ | 0.01 or none. |
| Versene Fe-3 [4] | 0.028 or none. |
| Hydrazine or derivatives A, B or C | Variable. |
| Temperature, °C | +5 |

[1] Mixture of fatty acid soaps.
[2] A blend of tertiary $C_{12}$ to $C_{16}$ aliphatic mercaptans.
[3] Tertiary-butylisopropylbenzene hydroperoxide.
[4] Tetra sodium salt of ethylenediamine tetra acetic acid.

| Run | Reductant Initiator | | $FeSO_4.7H_2O$/ Versene Fe-3, Parts | Percentage Conversion, 24.1 hours |
|---|---|---|---|---|
| | Type | Parts | | |
| 1 | Hydrazine | 0.032 | none | 5 |
| 2 | do | 0.032 | 0.01/0.028 | 10 |
| 3 | Derivative A | 0.159 | none | 10 |
| 4 | do | 0.159 | 0.01/0.028 | 35 |
| 5 | Derivative B | 0.24 | none | 7 |
| 6 | do | 0.24 | 0.01/0.028 | 31 |
| 7 | Derivative C | 0.254 | none | 54 |
| 8 | do | 0.254 | 0.01/0.028 | 26 |

The above results show that an improvement in the rate of polymerization was obtained with the use of the iron-Versene complex in all the systems except the last, experiment 8. The polyhydrazine derivatives and the mixtures all gave higher rates of polymerization than did hydrazine itself when compared on an equivalent basis as the reductant initiator.

EXAMPLE II

A series of emulsion polymerization experiments was carried out in which the mol ratio of dihydrazinoethane dihydrochloride to hydroperoxide was varied.

Recipe

| Components: | Parts by weight |
|---|---|
| Butadiene | 70 |
| Styrene | 30 |
| Water | 200 |
| K-ORR soap [1] | 5 |
| KCl | 0.3 |
| Diox 7 (27.6 percent) [1] | 0.755 |
| MTM [1] | 0.25 |
| Hydrazine or derivative | Variable |
| Temperature, °C | +5 |

[1] Refer to Example I.

| Run No. | Hydrazine, Parts | Dihydrazinoethane dihydrochloride | Hydrazine or Derivative Mole Ratio to Diox 7 | Percent Conversion at— | | |
|---|---|---|---|---|---|---|
| | | | | 22.8 Hrs. | 42.9 Hrs. | 138.3 Hrs. |
| 1 | 0.008 | | 0.25/1 | 4 | 23 | 32 |
| 2 | 0.064 | | 2/1 | 5 | 32 | 44 |
| 3 | 0.256 | | 8/1 | 11 | 40 | 53 |
| 4 | | 0.061 | 0.25/1 | 5 | 32 | 50 |
| 5 | | 0.121 | 0.5/1 | 6 | 41 | 63 |
| 6 | | 0.241 | 1/1 | 7 | 45 | 65 |
| 7 | | 0.482 | 2/1 | 4 | 40 | 62 |
| 8 | | 0.963 | 4/1 | 0 | 37 | 61 |
| 9 | | 1.926 | 8/1 | 0 | 36 | |

As will be evident to those skilled in the art, various modifications of this invention can be made or followed, in the light of the foregoing disclosure and discussion, without departing from the spirit or scope of the disclosure or from the scope of the claims.

We claim:

1. A process for the production of synthetic rubber, which comprises polymerizing a monomeric material, comprising a major portion of 1,3-butadiene and a minor portion of styrene, while dispersed in the presence of an emulsifying agent in an aqueous medium having a pH between 9 and 12 at a polymerization temperature between 30 and −40° C. in the presence of a polymerization catalyst composition comprising 0.1 to 10 millimols of a monohydroperoxide of tert-butylisopropylbenzene and 0.02 to 5 parts by weight of a dihydrazine having the formula $H_2NNHC_nH_{2n}NHNH_2$ wherein $n$ is in the range of 1 to 8, said amounts being per 100 parts by weight of said monomeric material.

2. A process for the production of synthetic rubber, which comprises polymerizing a monomeric material comprising a major portion of a conjugated diene having four to six, inclusive, carbon atoms per molecule, while dispersed in the presence of an emulsifying agent in an aqueous medium having a pH between 9 and 12 at a polymerization temperature between 30 and −40° C. in the presence of a polymerization catalyst composition comprising 0.1 to 10 millimols of a monohydroperoxide of tert-butylisopropylbenzene and 0.02 to 5 parts by weight of a reductant, selected from the group consisting of a dihydrazine having the formula $H_2NNHC_nH_{2n}NHNH_2$ wherein $n$ is in the range of 1 to 8, said amounts being per 100 parts by weight of said monomeric material.

3. A process for the production of synthetic rubber, which comprises polymerizing a monomeric material comprising a major portion of 1,3-butadiene and a minor portion of styrene while dispersed in the presence of an emulsifying agent in an aqueous medium having a pH between 9 and 12 at a polymerization temperature between 30 and −40° C. in the presence of a polymerization catalyst composition comprising 0.1 to 10 millimols of an organic peroxide compound which is effective as an oxidant in said polymerization and selected from the group consisting of compounds having the formula ROOR and compounds having the formula ROOH, wherein R is an organic radical, and 0.02 to 5 parts by weight of a reductant selected from the group consisting of a dihydrazine having the formula $H_2NNHC_nH_{2n}NHNH_2$ wherein $n$ is in the range of 1 to 8, said amounts being per 100 parts by weight of said monomeric material.

4. A process for the polymerization of a monomeric material comprising an organic compound having an active $CH_2=C<$ group and polymerizable while dispersed in an aqueous medium, which comprises polymerizing said monomeric material while dispersed in the presence of an emulsifying agent in an aqueous medium having a pH between 9 and 12 at a polymerization temperature between 30 and $-40°$ C. in the presence of a polymerization catalyst composition comprising 0.1 to 10 millimols of a monohydroperoxide of tert-butylisopropylbenzene and 0.02 to 5 parts by weight of dihydrazinoethane dihydrochloride, said amounts being per 100 parts by weight of said monomeric material.

5. In the polymerization of a monomeric material comprising an organic compound having an active $CH_2=C<$ group and polymerizable while dispersed in an aqueous medium at a polymerization temperature in the presence of an oxidant-reductant polymerization catalyst comprising an organic peroxidic compound and a reductant, said organic peroxidic compound being effective as an oxidant in said polymerization and selected from the group consisting of compounds having the formula ROOR and compounds having the formula ROOH wherein R is an organic radical, the improvement which comprises using as said reductant a compound selected from the group consisting of a dihydrazine having the formula $$H_2NNHC_nH_{2n}NHNH_2$$

wherein $n$ is in the range of 1 to 8.

6. A process for the polymerization of a monomeric material comprising an organic compound having an active $CH_2=C<$ group and polymerizable while dispersed in an aqueous medium, which comprises polymerizing said monomeric material while dispersed in the presence of an emulsifying agent in an aqueous medium at a polymerization temperature in the presence of an oxidant-reductant polymerization catalyst composition comprising a tri-substituted hydroperoxymethane as said oxidant and a reductant selected from the group consisting of a dihydrazine having the formula $H_2NNHC_nH_{2n}NHNH_2$ wherein $n$ is in the range of 1 to 8.

7. The process of claim 5 in which said monomeric material comprises a major portion of a conjugated diolefin hydrocarbon having four to six carbon atoms per molecule and said hydroperoxymethane is an alkaryldialkyl hydroperoxymethane.

8. In the production of synthetic rubber by polymerization of a monomeric material comprising a conjugated diene having not more than six carbon atoms per molecule while dispersed in an aqueous medium in the presence of a catalytic composition comprising an oxidant and a reductant, the improvement which comprises polymerizing said monomeric material in the presence of a dihydrazine having the formula $H_2NNHC_nH_{2n}NHNH_2$ wherein $n$ is in the range of 1 to 8 together with a material which acts as an oxidant in the presence of said polyhydrazine under said conditions of polymerization.

9. A process according to claim 5 wherein said reductant is dihydrazinoethane dihydrochloride.

10. A process according to claim 5 wherein said reductant is the reaction product of 1 mol ethylene chloride and 4 mols hydrazine.

11. A process according to claim 5 wherein said reductant is the reaction product of 1 mol ethylene chloride, 2 mols hydrazine and 2 mols ethylene diamine.

References Cited in the file of this patent

UNITED STATES PATENTS

| | | |
|---|---|---|
| 2,606,893 | Reynolds et al. | Aug. 12, 1952 |
| 2,629,708 | Uraneck et al. | Feb. 24, 1953 |
| 2,629,709 | Uraneck et al. | Feb. 24, 1953 |

U. S. DEPARTMENT OF COMMERCE
PATENT OFFICE

CERTIFICATE OF CORRECTION

Patent No. 2,822,354    Carl A. Uraneck et al.        February 4, 1958

It is hereby certified that error appears in the printed specification of the above numbered patent requiring correction and that the said Letters Patent should read as corrected below.

Column 10, line 9, for the claim reference numeral "5" read -- 6 --.

Signed and sealed this 3rd day of June 1958.

(SEAL)
Attest:

KARL H. AXLINE
Attesting Officer

ROBERT C. WATSON
Commissioner of Patents